United States Patent
Buck et al.

(10) Patent No.: US 10,888,823 B2
(45) Date of Patent: Jan. 12, 2021

(54) MEMBRANE WITH IMPROVED PERMEABILITY AND SELECTIVITY

(75) Inventors: Reinhold Buck, Alleshausen (DE); Jenny Deibert, Rottweil (DE); Arnd Wochner, Dottenhaussen (DE)

(73) Assignee: GAMBRO LUNDIA AB, Lund (SE)

( * ) Notice: Subject to any disclaimer, the term of this patent is extended or adjusted under 35 U.S.C. 154(b) by 1567 days.

(21) Appl. No.: 12/453,821

(22) Filed: May 22, 2009

(65) Prior Publication Data
US 2010/0294714 A1 Nov. 25, 2010

(51) Int. Cl.
*B01D 71/68* (2006.01)
*B01D 69/08* (2006.01)

(52) U.S. Cl.
CPC ............ *B01D 71/68* (2013.01); *B01D 69/08* (2013.01); *B01D 69/087* (2013.01); *B01D 2323/06* (2013.01); *B01D 2323/12* (2013.01); *B01D 2325/02* (2013.01); *B01D 2325/20* (2013.01); *B01D 2325/34* (2013.01)

(58) Field of Classification Search
CPC ..................................................... B01D 69/08
See application file for complete search history.

(56) References Cited

U.S. PATENT DOCUMENTS

2006/0144782 A1* 7/2006 Buck .................... 210/500.23
2008/0237127 A1* 10/2008 Okafuji ............... B01D 63/022
210/646

FOREIGN PATENT DOCUMENTS

WO WO2006024902 A1 * 9/2006 ............. A61M 1/18
WO WO2006106133 * 10/2006

OTHER PUBLICATIONS

Clark, William R., and Claudio Ronco, "Determinants of haemodialyser performance and the potential effect on clinical outcome," Nephrol Dial Transplant, 16 (Suppl. 5), 56-60 (2001).
Membrane Technologies and Applications, Kaustubha Mohanty and Mihir K. Purkait, eds., CRC Press, Taylor & Francis Group, Boca Raton, FL 33487-2742 (2012).

* cited by examiner

*Primary Examiner* — Peter Keyworth
(74) *Attorney, Agent, or Firm* — Barnes & Thornburg LLP (57) ABSTRACT

A semipermeable asymmetric hollow fiber membrane is provided, based on a hydrophobic polymer, such as polyethersulfone or polysulfone, and on a hydrophilic polymer, such as PVP. The PVP polymer comprises a high molecular weight component and a low molecular weight component. The membrane has a significantly improved permeability and selectivity, based on its structure, composition, and the method of manufacture of the membrane A process for manufacturing such a membrane by a solvent phase inversion spinning process is also provided.

21 Claims, 6 Drawing Sheets

MEMBRANE WITH IMPROVED PERMEABILITY AND SELECTIVITY

TECHNICAL FIELD

The present invention relates to a semipermeable asymmetric hollow fiber membrane based on polyethersulfone or polysulfone and PVP, wherein the membrane has a significantly improved permeability and selectivity, to a process for manufacturing such a membrane and to the use of the membrane in, for example, haemodialysis, haemofiltration or haemodiafiltration. Membranes of the above kind present special advantages when they are used in connection with different kinds of medical treatments. They may, however, also be used in dialysis and filtration in general, for example in water purification or dehydration.

BACKGROUND

Semipermeable asymmetric hollow fiber membrane are described in detail in, for example, EP 0 568 045 A1, EP 0 168 783 A1, EP 0 082 433 A2, WO 2004/056459 A1, EP 0 750 936 A1 and WO 86/00028 A1. These membranes are manufactured from polymeric synthetic materials; they have an asymmetric structure with high diffusive permeability (clearance) and have water filtration capability in ultrafiltration applications in the range of low flux to high flux. In EP-A-0 305 787, a 3-layer structure membrane and filter with corresponding performance, is disclosed. In Wienk et al. (1998), "A new spinning technique for hollow fiber ultrafiltration membranes", Journal of Membrane Science, 78, 93-100, the use of a high and low molecular weight PVP in a membrane based on polyethersulfone is described for the first time. EP 0 750 936 A1 describes the preparation and use of a polysulfone and PVP based membrane, wherein the PVP consists of a low and a high molecular weight component. WO 2004/056459 A1 describes a 4-layer membrane based on polyethersulfone, PVP and polyamide. While this membrane is efficient, it does not provide the exceptional selectivity and permeability of a membrane of the present invention, which is a function of the membrane geometry as well as the membrane composition and spinning technique, which differ from the membrane as described in the present invention.

Accordingly, while the membranes according to prior art perform adequately, there is still room for significant improvement and optimization of such membranes. For an optimal treatment high values for diffusive permeability (clearance) are desirable. To achieve such values, present day dialysers are designed to have a comparatively big size, both in terms of blood volume and also in terms of membrane surface per dialyser unit. The drawback of such dialysers lies in the high extracorporeal blood volume and the high surface area which is in contact with blood, which increases the risk of adverse reactions of the patient in need of treatment.

It is therefore clearly desirable to devise dialysers which achieve high clearance rates by making use of membranes which have an improved diffusive permeability for substances with low molecular weight (<500 Dalton), such as urea. Such membranes will allow for at least the same clearance rates as present day dialysers but with a smaller membrane surface area and, as a consequence, smaller dialysers. It is a further advantage of dialyzers with reduced size, that the consumption of raw materials and energy for preparing and shipping them is reduced. Thus, dialyzers with a reduced size and an equally good or improved performance are, in addition, preferable economically and ecologically.

In addition, it is desirable to provide membranes and dialyzers which are able to remove so-called middle sized molecules with high efficiency, while the loss of valuable proteins is low. This is generally referred to as the "selectivity" of a membrane. A high selectivity of a membrane, in the context of the present invention, allows achieving high removal rates for small and middle molecules while minimizing or avoiding the total loss of protein.

Today membranes and dialyzers generally provide for a good removal of such middle molecules at the price of a higher protein loss, or provide for a reduced protein loss at the price of a limited removal of middle sized molecules.

Clinical signs and symptoms of end-stage renal disease patients are at least in part related to the accumulation of "middle molecules" such as, for example, β2-microglobulin (~12 kD), parathyroid hormone (~7 kD), advanced glycation end products, advanced lipoxidation end products, advanced oxidation protein products (formed as a result of oxidative stress, carbonyl stress, or both), granulocyte inhibitory proteins, or leptin (~16 kD). Currently available membrane materials do not provide a long-lasting, effective reduction of middle molecules in conjunction with a low loss of higher molecular weight protein (above 50-60 kD).

The expression "protein" is intended to mean especially albumin and immunoglobins, but also proteins such as orosomucoid, opsonines and other proteins as well as other substances with a molecular weight which is higher than the permeability characteristic of the membrane.

It is therefore desirable to devise a membrane which has a structure and dimensions such that it prevents or minimizes passage of molecules and particles larger than a minimum diameter, which is normally defined in terms of molecular weight for the molecules which cannot pass through the membrane. At the same time, the membrane should allow for the efficient removal of middle molecules. In other words, it is desirable to provide a membrane with improved selectivity. Preferably, such new membrane should have both an improved selectivity and should also have an improved diffusive permeability in comparison with present day membranes and dialysers using such membranes.

The present invention is, therefore, especially directed to a semipermeable membrane with improved selectivity and improved diffusive permeability.

SUMMARY OF THE INVENTION

The object of the present invention is to provide improved hollow fiber membranes with regard to diffusive permeability and selectivity, comprised of at least one hydrophobic polymer, such as polyethersulfone or polysulfone, and at least one hydrophilic polymer, being suitable for, for example, haemodialysis.

This object is achieved by a hollow membrane preferably based on the hydrophobic polymer polyethersulfone and on the hydrophilic polymer polyvinylpyrrolidone, wherein the polyvinylpyrrolidone consists of a low molecular weight component having a molecular weight of below 100 kD and a high molecular weight component having a molecular weight of 100 kD or more.

Figure 1:
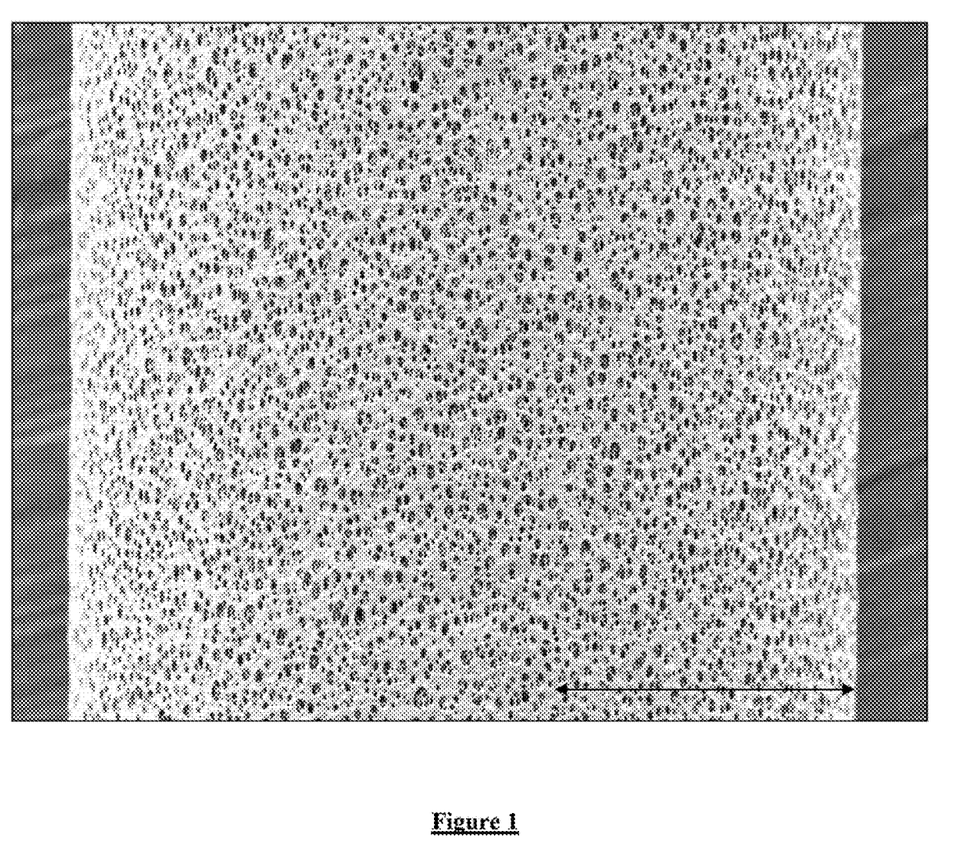
FIG. 1 depicts an electron micrograph of the outer surface of a membrane according to a preferred embodiment of the invention and as prepared according to Example 1. The pores have a diameter of between 1 and 3 µm. There are about 45000 pores available per mm². The black arrow indicates 100 µm.

The membrane is characterized by an outer surface having pores in the size range of 0.5 to 3 μm and having a number of said pores in the range of 10000 to 150000 pores per mm$^2$, preferably in the range of 20000 to 80000 pores per mm², most preferably 35000 to 55000 pores per mm² (see FIG. 1).

Figure 2:
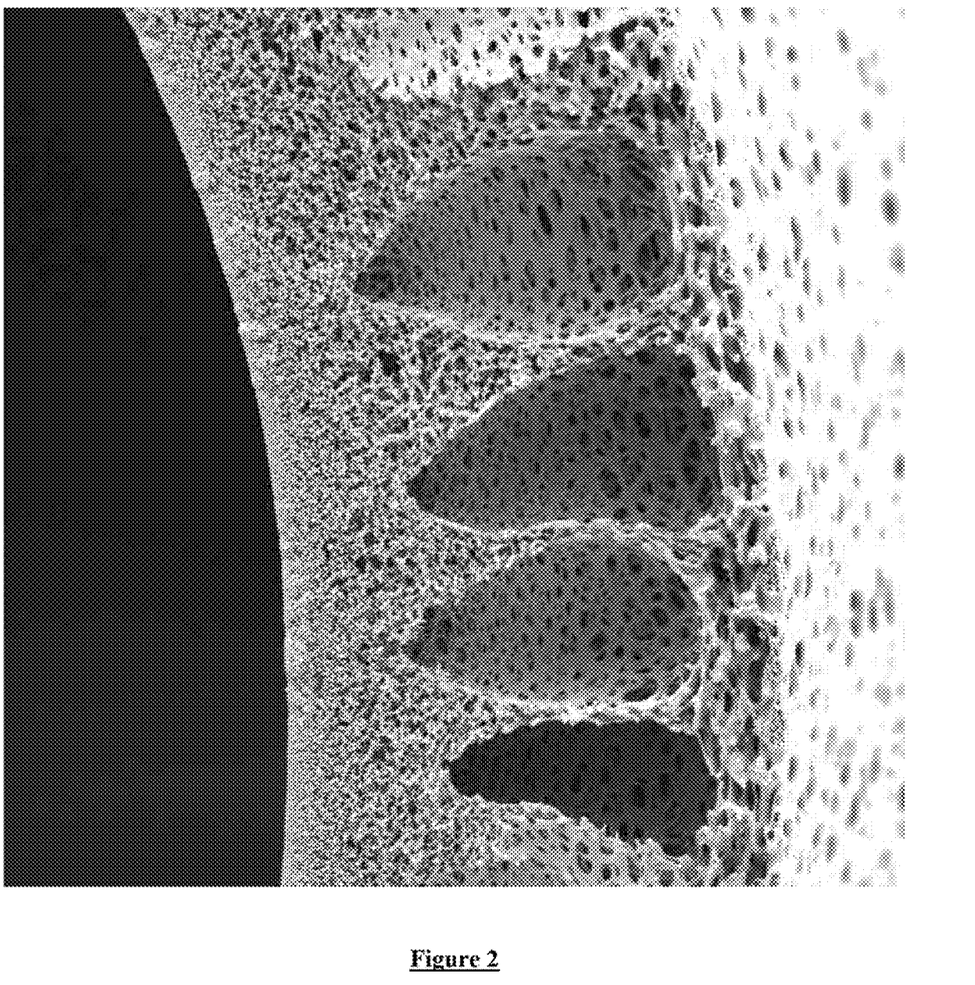

The membrane is further characterized by a very specific four-layer structure and by having a diffusive permeability of chloride of about $19.1 \cdot 10^{-4}$ cm/sec measured at 37° C. The diffusive permeability can be determined according to E. Klein, F. Holland, A. Lebeouf, A. Donnaud, J. K. Smith, "Transport and Mechanical Properties of Hemodialysis Hollow Fibers", Journal of Membrane Science 1 (1976) 371-396, especially pages 375-379. In FIG. 2, a scanning micrograph is shown for this preferred four-layer structure.

The inner layer of the four-layer structure, i.e., the blood contacting layer and the inner surface of the hollow fiber membrane, is a separation layer in the form of a dense, rather thin layer having, in a preferred embodiment, a thickness of less than 1 µm and a pore size in the nano-scale range. To achieve high selectivity the pore channels with the responsible pore diameters are short, i.e. below 0.1 µm. The pore channel diameter has a low variation in size. The defined pore structure is achieved by selection of the composition of the polymer, the composition and condition of the precipitation media in the center fluid and by the condition and composition of the surrounding environment of the fiber leaving the spinning nozzle.

The next layer in the hollow fiber membrane is the second layer having the form of a sponge structure and, in a preferred embodiment of the present invention, a thickness of about 1 to 15 µm and serving as a support for said first layer.

Then, there is the third layer having the form of a finger structure. It provides for mechanical stability on the one hand; on the other hand it has, through the high void volume, a very low resistance of transport of molecules through the membrane. During the process the voids are filled with water and the water gives a lower resistance for diffusion and convection than a matrix with a sponge-filled structure having a lower void volume. Accordingly, the third layer gives the membrane mechanical stability and has, in a preferred embodiment of the present invention, a thickness of 20 to 60 µm.

The fourth layer in this preferred embodiment of the present invention is the outer layer, with the outer surface according to above. This fourth layer has in a preferred embodiment a thickness of about 1 to 10 µm.

This four-layer design provides for a high selectivity, which means, a high potential to separate molecules, which are close in their size, for example, to separate albumin, which is to be retained, from a β2-microglobulin and Factor D.

In a preferred embodiment the membrane according to the present invention consists of 80-99% by weight of said at least one hydrophobic polymer, preferably polyethersulfone, and 1-20% by weight of said at least one hydrophilic polymer, preferably polyvinylpyrrolidone (PVP). The PVP consists of a high (≥100 kD) and low (<100 kD) molecular component, wherein the PVP consists of 10-45 weight-% based on the total weight of PVP in the membrane, of a high molecular weight component, and of 55-90 weight-% based on the total weight of PVP in the membrane, of a low molecular weight component.

The membrane according to a preferred embodiment of the present invention, due to its specific preparation and membrane characteristics as described before, is especially characterized by a high convective permeability Lp and a high diffusive permeability for small molecules, such as, for example, for urea or chloride ($P_{Cl}$). The Lp is in the range of between $56 \cdot 10^{-4}$ and $84 \cdot 10^{-4}$ cm/bar·s, preferably between 70 and $80 \cdot 10^{-4}$ cm/bar·s. The chloride permeability $P_{Cl}$ is in the range of between $18 \cdot 10^{-4}$ and $21 \cdot 10^{-4}$ cm/s, preferably between $19 \cdot 10^{-4}$ and $20 \cdot 10^{-4}$ cm/s.

The membrane is further characterized by a high selectivity, i.e., a high removal rate for middle molecules while at the same time the loss of protein of higher molecular weight is minimized. The membrane according to the invention has a sieving coefficient ($SC_{Myo}$) for myoglobin (17053 Dalton) in aqueous solution of between 85 and 90%, and a sieving coefficient ($SC_{Albu}$) for albumin (66248 Dalton) in aqueous solution of 9% or less. The selectivity in aqueous solution of the membrane according to a preferred embodiment of the invention, calculated as the ratio of $SC_{Myo}/SC_{Albu}$, accordingly is between 9.4 and 10 or higher.

A further object of the present invention is to provide a process for the preparation of the membrane according to the present invention.

This object is achieved by a solvent phase inversion spinning process, comprising the steps of
a) said at least one hydrophilic polymer and said at least one hydrophobic polymer are dissolved in at least one solvent to form a polymer spinning solution,
b) said formed polymer spinning solution is extruded through an outer ring slit of a nozzle with two concentric openings,
c) a center fluid is extruded through the inner opening of the nozzle, and thereafter
d) said membrane is washed and preferably dried and sterilized by steam treatment.

According to a preferred embodiment of the present invention, the polymer spinning solution coming out through the outer slit opening is, on the outside of the precipitating fiber, exposed to a humid steam/air mixture comprising a solvent in a content of between 0 and 10% by weight related to the water content.

Yet another object of the present invention is the use of the membrane in haemodialysis, haemodiafiltration, haemofiltration, and in dialysis and filtration in general, for example for water purification or dehydration.

Other objects, features, advantages and preferred embodiments of the present invention will become apparent from the following detailed description when taken in conjunction with the enclosed scanning micrographs and the appended claims.

BRIEF DESCRIPTION OF THE DRAWINGS

Preferred embodiments of the present invention will now be described in more detail. Reference will be made to enclosed drawings.

FIG. 2 shows an electron micrograph of a cross-section of the membrane according to a preferred embodiment of the invention and according to Example 1. The 4-layer structure can be seen, including the inner, blood contacting layer, which is a separation layer, the second layer having sponge structure, the third layer in the form of a finger structure and the fourth outer layer with an outer surface as shown in FIG. 1.

FIG. 3 shows the sieving coefficients for the middle molecule myoglobin in % for a membrane according to a preferred embodiment of the invention, depicted as "HDC4"

(Example 1) and, for comparison, for additional membranes of the state of the art. All membranes shown are based on polysulfone or polyethersulfone and PVP. As can be seen, the sieving coefficient of the HDC4 membrane is clearly improved and reaches 88% removal.

FIG. 5 thus summarizes the results as shown in FIGS. 3 and 4. As can be seen from this Figure, the membranes according to the state of the art which have a low loss of protein suffer from a low removal rate for middle molecules such as myoglobin, whereas those with a good efficacy in removing said middle molecules suffer from a higher loss of protein. The membrane according to a preferred embodiment of the present invention is able to combine optimal performance abilities in both fields.

DETAILED DESCRIPTION OF THE INVENTION

The semipermeable hollow membrane according to the invention is preferably based on at least one hydrophobic polymer and on at least one hydrophilic polymer. Said at least one hydrophobic polymer is preferably chosen from the group consisting of polyamide (PA), polyaramide (PAA), polyarylethersulfone (PAES), polyethersulfone (PES), polysulfone (PSU), polyarylsulfone (PASU), polycarbonate (PC), polyether, polyurethane (PUR), polyetherimide and copolymers of said polymers, preferably polyethersulfone or a mix of polyarylethersulfone and polyamide. Polyethersulfone and polysulfone are preferred for use hydrophobic polymers. Preferably, polyethersulfone is used for preparing a membrane according to the invention.

Said at least one hydrophilic polymer is preferably chosen from the group consisting of polyvinylpyrrolidone (PVP), polyethylene glycol (PEG), polyglycolmonoester, water soluble cellulosic derivates, polysorbate and polyethylenepolypropylene oxide copolymers. Preferably, polyvinylpyrrolidone is used for preparing a membrane according to the invention, wherein the polyvinylpyrrolidone consists of a low molecular weight component having a molecular weight of below 100 kD and a high molecular weight component having a molecular weight of 100 kD or more.

A preferred embodiment of the membrane according to the present invention consists of 80-99% by weight of said hydrophobic polymer, preferably polyethersulfone, and 1-20% by weight of said at least one hydrophilic polymer, preferably polyvinylpyrrolidone (PVP). The PVP consists of a high (≥100 kD) and low (<100 kD) molecular component, wherein the PVP consists of 10-45 weight-% based on the total weight of PVP in the membrane, of a high molecular weight component, and of 55-90 weight-% based on the total weight of PVP in the membrane, of a low molecular weight component.

The polymer spinning solution for preparing a membrane according to the present invention preferably comprises between 12 and 15 weight-% of polyethersulfone or polysulfone as hydrophobic polymer and 5 to 10 weight-% of PVP, wherein said PVP consists of a low and a high molecular PVP component. The total PVP contained in the polymer spinning solution consists of between 22 and 34 weight-% and preferably of between 25 and 30 weight-% of a low molecular weight component and of between 66 and 78 weight-%, preferably of between 70 and 75 weight-% of a high molecular weight component. Examples for high and low molecular weight PVP are, for example, PVP K85/K90 and PVP K30, respectively.

The polymer spinning solution, used in the process of the present invention preferably further comprises 66-86% by weight solvent and 1-5% by weight suitably additives. Suitable additives are, for example, chosen from the group of water, glycerol and/or other alcohols. Water is especially preferred in the context of the present invention and is present in the polymer spinning solution in an amount of between 1-8% by weight, preferably in an amount of between 2-5% by weight. The solvent used in the process of the present invention preferably is chosen from the group comprising n-methylpyrrolidone (NMP), dimethylacetamide (DMAC), dimethylsulphoxide (DMSO), dimethylformamide (DMF), butyrolactone and mixtures of said solvents. NMP is especially preferred in the context of the present invention. Preferably, the polymer spinning solution is homogenously degassed and filtered.

The center fluid or bore liquid which is used for preparing the membrane according to a preferred embodiment of the invention comprises at least one of the above-mentioned solvents and precipitation medium chosen from the group of water, glycerol and other alcohols. Most preferably the center fluid consists of 45-70% by weight precipitation medium, 30-55% by weight of solvent. Preferably, the center fluid consists of 51-57% by weight of water and 43-49% by weight of NMP. Again the center fluid should be degassed and filtered.

The viscosity of the polymer spinning solution should be in the range of between 2500 and 7000 mPa·s, preferably between 3500 and 5500 mPa·s.

In a preferred embodiment of the process according to the present invention the temperature of the spinneret is 30-70° C., preferably 45-55° C., the temperature of the spinning shaft is 25-65° C., preferably 40-50° C. The distance between the opening of the nozzle and the precipitation bath is between 25 and 1500 mm, preferably between 550 and 1100 mm. The precipitation bath has a temperature of 10-40° C., preferably of 15-25° C. The spinning velocity preferably should be in the range of between 25-80 m/min, preferably between 30-60 m/min. The temperature of the humid steam/air mixture is at least 15° C., preferably at least 30° C., and at most 75° C., but is preferably not higher than 60° C. Further, the relative humidity in the humid steam/air mixture is between 60 and 100%.

In another embodiment of the present invention the humid steam/air mixture comprises a solvent in a content of between 0 and 5% by weight related to the water content. Preferably, the humid steam/air mixture may comprise a solvent in a content of between 0 and 3% by weight related to the water content. The effect of the solvent in the temperature controlled steam atmosphere is to control the speed of precipitation of the fibres. If less solvent is employed, the outer surface will obtain a more dense surface, and if more solvent is used the outer surface will have a more open structure. By controlling the amount of solvent within the temperature controlled steam atmosphere surrounding the precipitating membrane, the amount and size of the pores on the outer surface of the membrane can be modified and controlled.

The membrane according to a preferred embodiment of the present invention will then preferably be washed in water to remove waste components, and then be dried at temperatures between 150-280° C., preferably between 180-260° C. Such drying will provide for an adequate evaporation of water and a defined shrinkage of pores. The final treatment consists of rinsing the membrane in water at a temperature of 50-95° C., preferably 80-90° C. and subsequent drying at temperatures of 30-65° C. preferably 55-65° C.

The membrane is preferably steam sterilized at temperatures above 121° C. for at least 21 minutes.

In FIG. 2, an electron scanning micrograph is shown of the resulting membrane having a four-layer structure. The inner layer of the four-layer structure, i.e. the blood contacting layer and the inner surface of the hollow fiber membrane, is a separation layer in form of a dense rather thin layer having, in a preferred embodiment, a-thickness of less than 1 µm and a pore size in the nano-scale range. To achieve high selectivity the pore channels are short, preferably below 0.1 µm. The pore channel diameter has a low variation in size. The next layer in the hollow fiber membrane is the second layer having the form of a sponge structure and, in a preferred embodiment of the present invention, a thickness of about 1 to 15 µm and serving as a support for said first layer. Then, there is the third layer having the form of a finger structure. It provides mechanical stability on the one hand and on the other hand it has a very low resistance of transport of molecules through the membrane due to the high void volume. During the process the voids are filled with water and the water gives a lower resistance for diffusion and convection than a matrix with a sponge-filled structure having a lower void volume. Accordingly, the third layer gives the membrane mechanical stability and has, in a preferred embodiment of the present invention, a thickness of about 20 to 60 µm. The fourth layer in this preferred embodiment of the present invention is the outer layer. This fourth layer has in a preferred embodiment a thickness of about 1 to 10 µm.

The membrane according to the invention has a preferred inner diameter of between 180 and 200 µm. Preferably, the inner diameter should be around 190 µm. The wall thickness of the hollow fiber should be between 30 and 40 µm, preferably the wall thickness should be around 35 µm.

Such spinning and final treatment conditions as described in combination with the specific geometry of the fiber, i.e. wall thickness, will provide for the above-disclosed 4-layer asymmetric hollow fiber membrane with improved selectivity and diffusive permeability.

The high performance rates of the membrane according to the present invention allow to devise dialyzers which are significantly reduced in sized without suffering from a reduced performance, e.g. in connection with the clearance rate of small molecules. The reduction is based on the improved performance of the membrane, as well as the reduced wall thickness, length and diameter of the membrane which is needed to arrive at the same or improved results as present day dialyzers. Accordingly, the membrane according to the present invention can be used to design a dialyzer with reduced size, as summarized in Table I. Table I compares the size of dialyzers which are state of the art with a dialyzer prepared on the basis of the membrane according to the invention. Table I gives exemplary data for inner diameter (di), wall thickness (w.th.), effective fiber length ($l_{eff}$), number of fibers per dialyzer (n) and effective surface area ($A_{eff}$). As can be seen, the dialyzer based on the present membrane, depicted as "HDC4", can be reduced, especially with regard to wall thickness and effective surface area compared to membranes which are state of the art, without having to cope with reduced performance efficacy (see FIG. 3 to 6 and Tables II-IV, where the same dialyzers/membranes are being compared).

| Membrane/Dialyzer Type | di [µm] | w.th. [µm] | $l_{eff}$ [mm] | n | $A_{eff}$ |
|---|---|---|---|---|---|
| HDC4 | 190 | 35 | 236 | 12024 | 1.69 |
| O18 | 190 | 41 | 230 | 12192 | 1.67 |
| O20 | 190 | 41 | 230 | 13974 | 1.92 |
| F8 | 175 | 40 | 226 | 13015 | 1.62 |
| F10 | 1688 | 44 | 226 | 16849 | 2.01 |
| X19 | 195 | 34 | 268 | 11170 | 1.83 |
| X21 | 195 | 34 | 283 | 11955 | 2.07 |
| P21H | 215 | 50 | 260 | 11640 | 2.04 |

The expression "selectivity" as used in the present application refers to the unique ability of the membrane as described here to remove so-called middle sized molecules (500-60000 Dalton), while the loss of valuable proteins having a higher molecular weight, such as, for example, albumin, should be low. The specific selectivity of a membrane can be described by determining the sieving coefficient, in water or plasma, of the middle molecule myoglobin, having a molecular weight of 17053 D, and of the protein albumin, having a molecular weight of 66248 D, i.e. $S_{Myo}/SC_{Albu}$.

The membrane according to a preferred embodiment of the present invention provides for a sieving coefficient for myoglobin as measured in an aqueous solution of between 86% and 90%, preferably about 88%, i.e. 88% of the myoglobin present will be removed from the solution. Measurements are done in PBS-buffer The expression convective permeability (coefficient) Lp generally refers to the transport flux of the solvent, per unit pressure difference across the membrane. The solute permeability (coefficient), Ls represents the transport flux of the solute per unit concentration difference. The expression "convective permeability" in the context of the present invention generally refers to the Lp of a membrane.

Convective and diffusive permeability are strongly dependent on the wall thickness. Membrane thickness is one important determinant of diffusive transport. Another major determinant of dialyzer membrane diffusive transport is porosity, also known as pore density. Membrane porosity is directly proportional to both the number of pores and the square of the pore radius. Accordingly, the major determinants of flux and diffusive permeability are the number of pores, the square of the pore radius and wall thickness.

The porosity, or percent void volume, of the membrane according to a preferred embodiment of the invention is, high, i.e. 80% or higher.

The membrane according to a preferred embodiment of the present invention has been optimized with regard to all determinants controlling flux and diffusive permeability, thus resulting in a membrane which reaches values for Lp and $P_{Cl}$ that have not been described before, especially in connection with the exceptionally good selectivity as described before. The convective permeability Lp is in the range of between $56 \cdot 10^{-4}$ and $84 \cdot 10^{-4}$ cm/bar·s, preferably between 70 and $80 \cdot 10^{-4}$ cm/bar·s, which is highest compared to membranes of the prior art (see Table II). Table II compares exemplary values for convective permeability of the membrane according to the invention ("HDC4") and other membranes (dialyzers) of the prior art (see Ex. 4).

TABLE II

| Parameter | Unit | HDC4 | P21H | X | F | O |
|---|---|---|---|---|---|---|
| Convective Permeability Lp | cm/bar · s | 75 | 62 | 44 | 39 | 25 |

Figure 6:
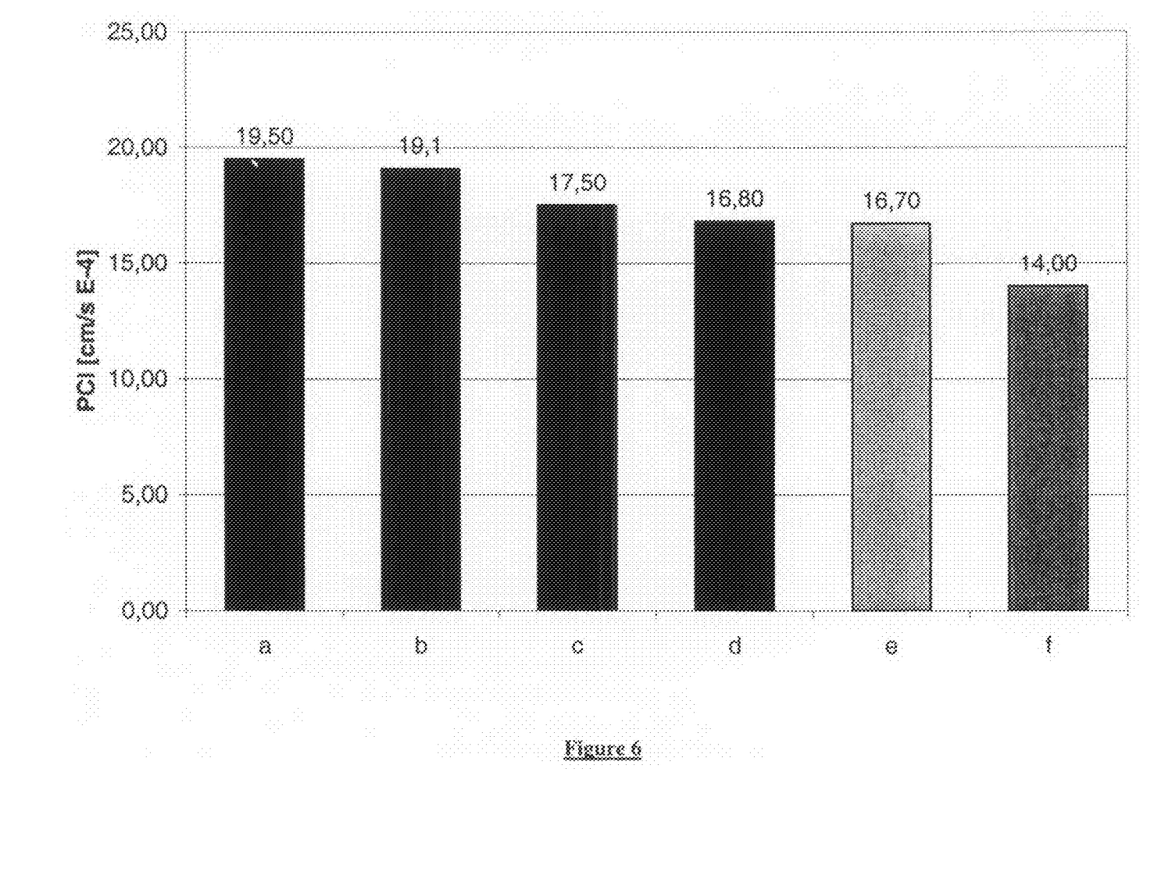
FIG. 6 shows the results for the diffusive permeability for chloride in $cm/s \cdot 10^{-4}$ for a membrane according to a preferred embodiment of the invention (b) (Example 1) and, for comparison, for additional membranes of the state of the art, (a) and (c)-(f) (Example 5). All membranes shown are based on polysulfone or polyethersulfone and PVP. As can be seen, the membrane according to invention, in spite of its increased sieving coefficient for middle molecules and reduced loss of protein does not suffer from a lower diffusive permeability for small molecules.

The chloride permeability $P_{Cl}$ is in the range of between $18 \cdot 10^{-4}$ and $21 \cdot 10^{-4}$ cm/s, preferably between $19 \cdot 10^{-4}$ and $20 \cdot 10^{-4}$ cm/s (see FIG. 6).

The membrane according to a preferred embodiment of the invention is further characterized by a high selectivity, i.e. a high removal rate for middle molecules while at the same time the loss of protein of higher molecular weight is minimized. The membrane has a sieving coefficient ($SC_{Myo}$) for myoglobin (17053 Dalton) in aqueous solution of between 85 and 90%, and a sieving coefficient ($SC_{Albu}$) for albumin (66248 Dalton) in aqueous solution of 9% or less. The selectivity in aqueous solution of the membrane according to a preferred embodiment of the invention, calculated as the ratio of $SC_{Myo}/SC_{Albu}$, accordingly is between 9.4 and 10 or higher.

EXAMPLES

Example 1

Preparation of the Membrane

A polymer spinning solution is prepared by mixing 14.0 wt.-% of polyethersulfone, 5.0 wt.-% of PVP K30, 2.0 wt.-% of PVP K85/K90, 3 wt.-% of water and 76.0% of NMP. A mixture of 55 wt.-% water and 45 wt.-% NMP serves as center fluid. The viscosity of the polymer spinning solution, measured at a temperature of 22° C., is 4230 mPa·s.

The center fluid is heated to 55° C. and pumped towards a two-component hollow fiber spinneret. The polymer spinning solution is leaving the spinneret through an annular slit with an outer diameter of 0.5 mm and an inner diameter of 0.35 mm. The center fluid is leaving the spinneret in the center of the annular polymer spinning solution tube in order to start the precipitation of the polymer spinning solution from the inside and to determine the inner diameter of the hollow fiber.

At the same time the two components (polymer spinning solution and center fluid) are entering a space separated from the room atmosphere. The space is called a spinning shaft. A mixture of steam (100° C.) and air (22° C.) is injected into the spinning shaft. The temperature in the spinning shaft is adjusted by the ratio of steam and air at about 45° C. and a relative humidity of 99.5%. The length of the spinning shaft is 890 mm. By the aid of gravity and a motor-driven roller, the hollow fiber is drawn from top to bottom, from spinneret through the spinning shaft into a water bath in vertical direction. The spinning velocity is 50 m/min. The hollow fiber is subsequently led through a cascade of water bathes and temperatures increasing from 15 to 40° C. The wet hollow fiber membrane leaving the water-rinsing bath is dried in a consecutive online drying step. After a texturizing step, the hollow fiber is collected on a spinning wheel in the shape of a bundle. Alternatively, hand bundles according to Example 7 can be formed.

After introducing the bundle into a dialyser housing, it is potted with polyurethane, ends are cut, on both sides of the dialyser a header is fixed to the housing, the dialyser is rinsed with hot water and dried with air. During this last drying step, an amount of 17 g of residual water per m² effective membrane area is left on the dialyser. After labelling and packaging, the dialyser is steam-sterilized within the package in an autoclave at 121° C. for 25 min.

Scanning micrographs of the outer surface and of the 4-layer structure of the hollow fiber according to Example 1 are shown in FIGS. 1 and 2. The hollow fiber according to this example had 45500 pores in the range of 1 to 3 µm per mm2. The inner diameter was adjusted to be 190 µm and the wall thickness was chosen to be 35 µm.

Example 2

Sieving Coefficients for Myoglobin and Albumin and Selectivity of the Membrane

The sieving coefficient of a membrane according to Example 1 was determined for myoglobin and albumin in PBS buffer (8 g NaCl, 0.2 g KCl, 1.44 g $Na_2HPO_4$, 0.24 g $KH_2PO_4$ in 800 ml of distilled $H_2O$; pH adjusted to 7.4 with HCl; $H_2O$ added to give 1 liter; sterilized by autoclave) for 25 minutes. The myoglobin concentration in the solution was 100 mg/l PBS-buffer. The albumin concentration in the solution was 60 g/l PBS-buffer.

Generally, for all tested membranes (comparative examples with membranes/dialyzers of the state of the art), the following equation for adjusting the QB was used: $\gamma \cdot n \cdot \pi \cdot di^3 \cdot 60/32 + J_v \cdot A \cdot 30$, wherein $\gamma$ is 461 l/s and $J_v$ is $0.0704 \cdot 10-4$ cm/s for all so-called High-Flux membranes as in the present cases, n is the number of fibers in the bundle (12024), di is the inner diameter of the fiber in µm (190) and A is the membrane surface in cm² (1.8). For adjusting the UF, the following equation was used: $J_v \cdot A \cdot 60$. The values used for the membrane according to the inventions are exemplarily given in brackets.

15 minutes after the beginning of the test, first samples are taken. One is taken at the blood side (A), one from the retentate (R) and one from the filtrate (F). The sieving coefficient (SC) is determined according to the equation $SC[\%] = 2 \cdot c(F)/[c(A)+c(R)] \cdot 100\%$.

Figure 3:
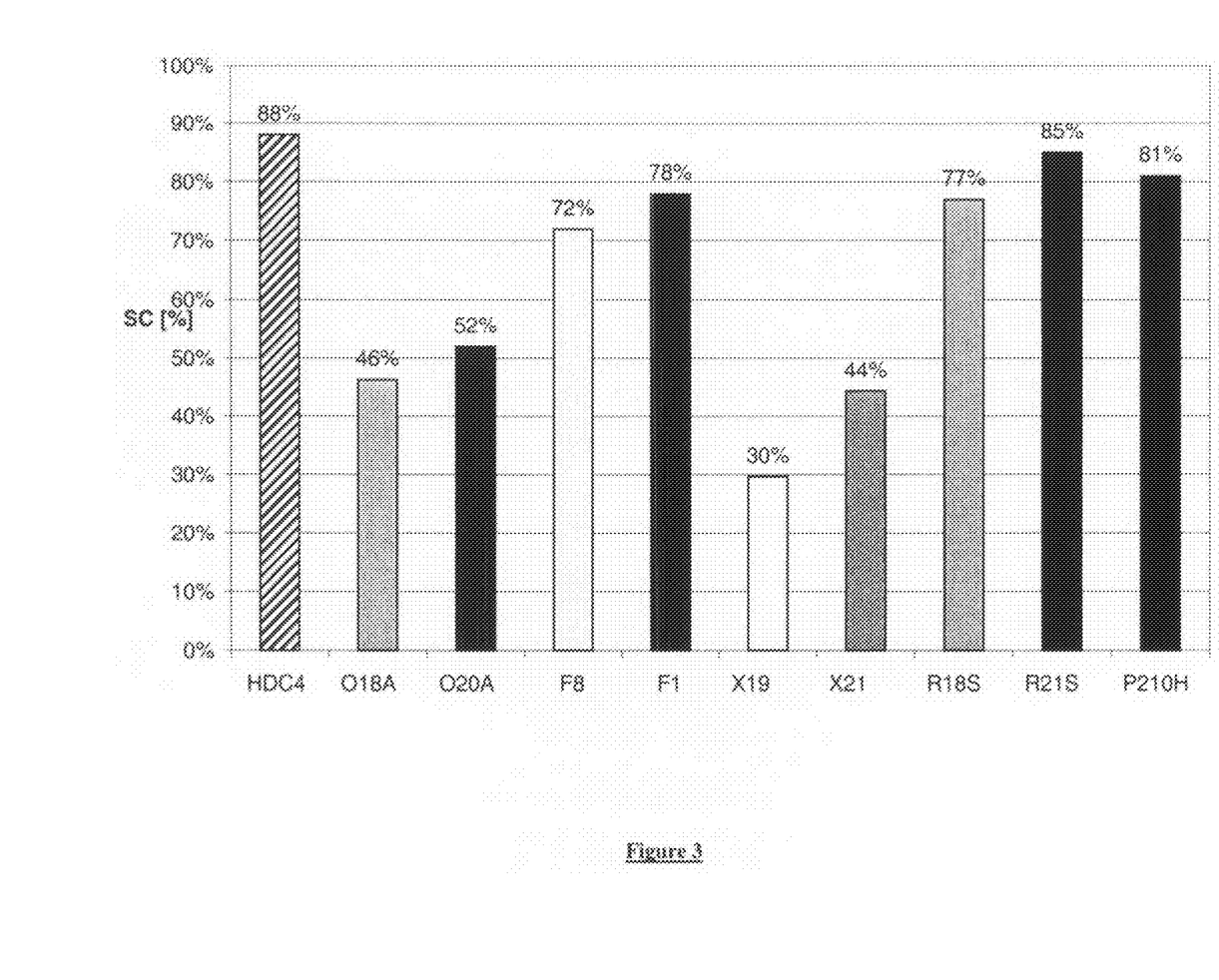

FIG. 3 shows the results for the SC of myoglobin for the membrane according to the invention (see Example 1) in column "HDC4". All other columns show results for polysulfone or polyethersulfone and PVP based membranes/dialyzers of the prior art, for comparison.

The sieving coefficient for albumin was also determined. In an aqueous (PBS) solution, the SC for the membrane according to the invention was determined to be 9%, resulting in a selectivity for the membrane of $[S_{Myo}/SC_{Albu}]$ of 9.8 or $[S_{Myo}-SC_{Albu}]$ of 79%, see Table III.

Table III summarizes the results for the SC for myoglobin and albumin for the membrane according to the invention ("HDC4") and for membranes (dialyzers) which are the current state of the art. HDC4 provides for a very good combination of the SC of myoglobin and albumin, i.e. selectivity as described before. The data have been obtained in aqueous solutions. Corresponding results can be obtained when the SC is measured in plasma.

TABLE III

| Parameter | Unit | HDC4 | O180A | O200A | F8 | F1 | X19 | X21 | R18S | R21S | P210H |
|---|---|---|---|---|---|---|---|---|---|---|---|
| SC Myo | % | 88 | 46 | 52 | 72 | 78 | 30 | 44 | 77 | 85 | 81 |
| SC Alb | % | 9 | 4 | 3 | 2 | 7 | 2 | 2 | 7 | 8 | 9 |
| $S_{Myo}/SC_{Albu}$ | — | 9.8 | 10.7 | 17.3 | 36.0 | 11.1 | 14.8 | 22.2 | 11.0 | 10.6 | 9.0 |
| $S_{Myo} - SC_{Albu}$ | % | 79 | 42 | 49 | 70 | 71 | 28 | 42 | 70 | 77 | 72 |

Example 3

Loss of Protein

The analysis of the removal of valuable protein, such as albumin is determined by pumping bovine blood (protein content of 60 g/l) with a defined haematocrit (32%) under defined conditions (QB=400 m/min; TMP 300 mmWs; 37° C.) through a membrane bundle and determining the concentration of the total protein in the feed, in the retentate and in the filtrate. The sampling takes place at the earliest 10 minutes after a constant TMP is adjusted. The test is carried out in the single-pass modus. The bovine blood is heated up by a heat exchanger to 37° C. before entering the fibre bundle. The retentate and the feed samples are centrifuged before the determination of the concentration of the total protein. The determination of the total protein is done photometrical.

Figure 4:
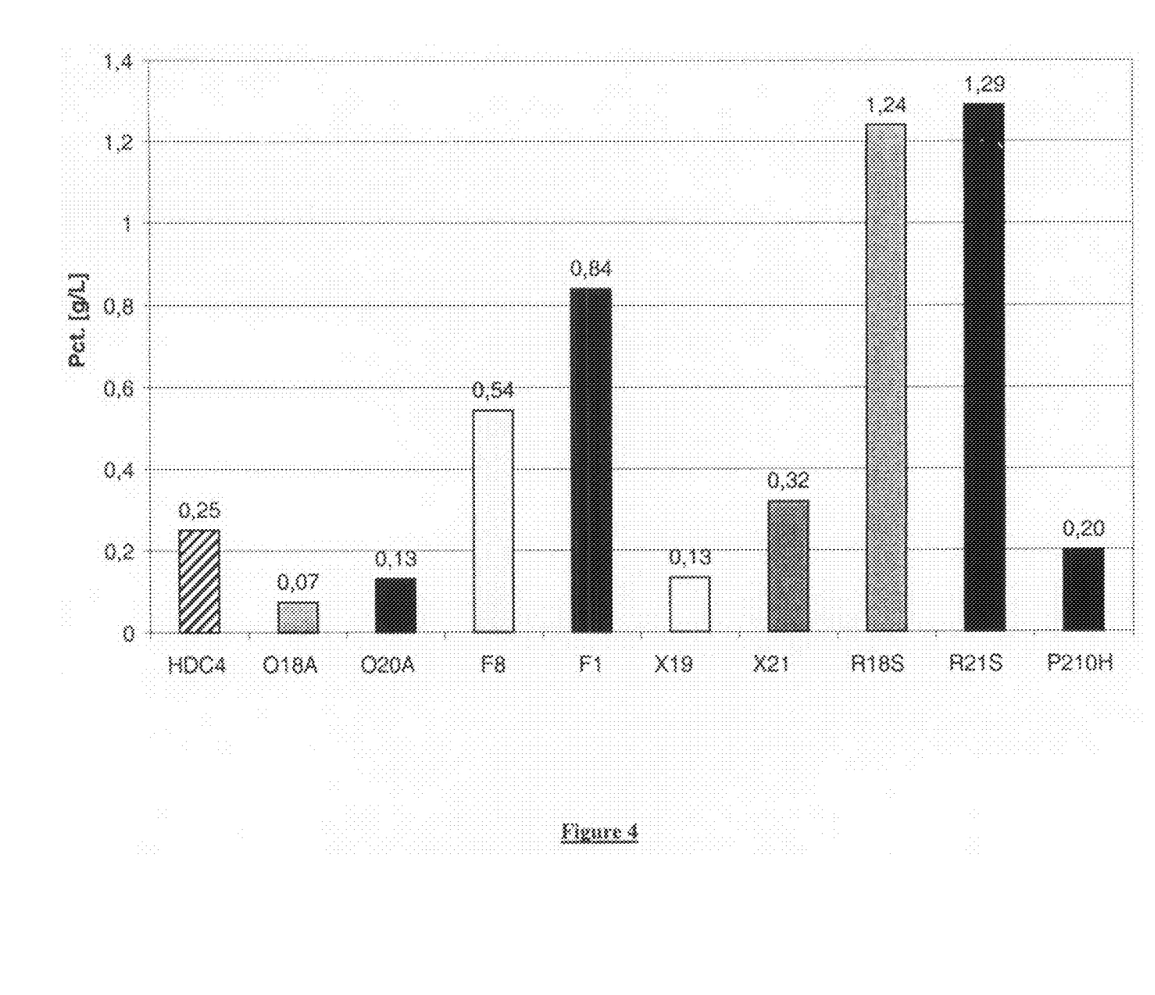
FIG. 4 shows the loss of protein, such as albumin, in g/l for a membrane according to a preferred embodiment of the invention, depicted as "HDC4" (Example 1) and, for comparison, for additional membranes of the state of the art. All membranes shown are based on polysulfone or polyethersulfone and PVP. As can be seen, the loss of protein, if not the lowest of all tested membranes, is among the lowest achieved. This is remarkable in connection with the high removal rate for the so-called middle molecules (see, for example, FIG. 3 and Example 2), indicating that the membrane of the present invention has a strongly improved ability to select between molecules of medium size and larger proteins which are preferably retained ("selectivity", see FIG. 5).
Figure 5:
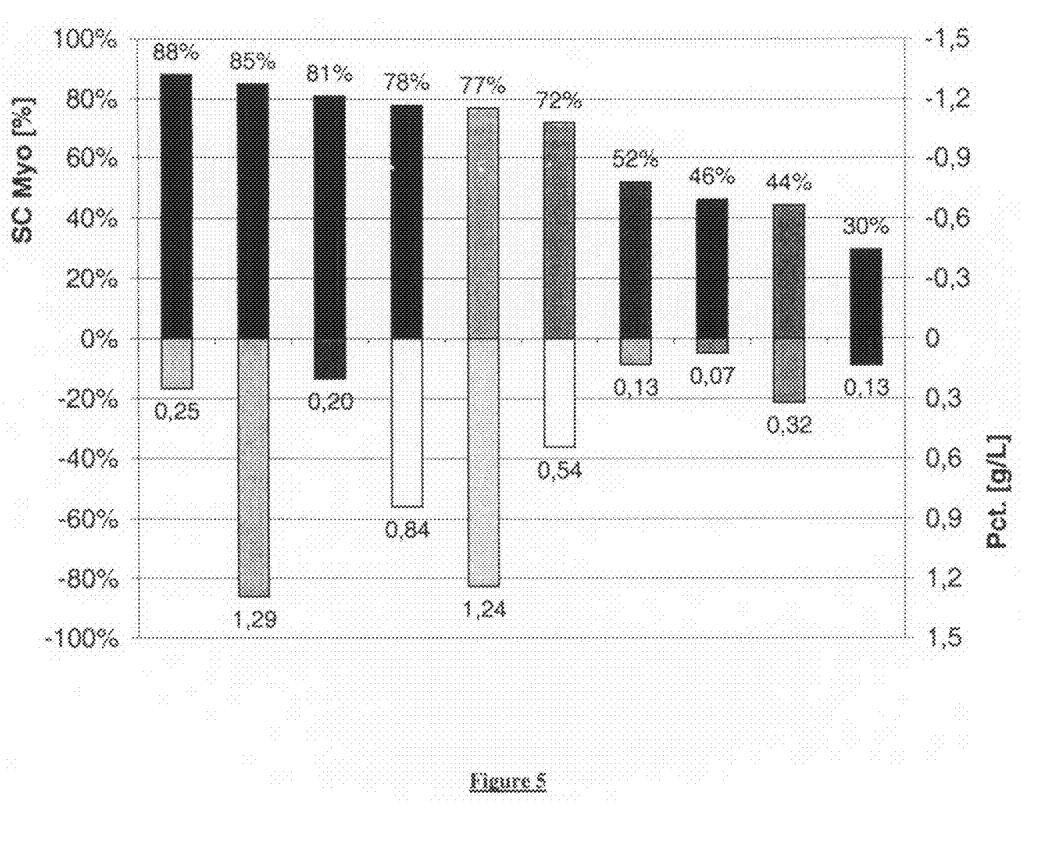
FIG. 5 shows both the sieving coefficient for myoglobin in % and the protein loss in g/l, for comparison.

FIG. 4 shows the results for a membrane prepared according to a preferred embodiment of the invention (see Example 1) and other membranes of the state of the art for comparison. The values given (Pct.) refer to the total loss of protein in g/l. FIG. 5 shows the combination of FIGS. 3 and 4 by showing both the sieving coefficient for myoglobin and the protein loss, thereby demonstrating the specific advantage of the membrane according to a preferred embodiment of the invention.

Example 4

Convective Permeability Lp

The convective permeability was determined with a hand bundle as described in Example 7. For determining the Lp of a given hand bundle, said hand bundle is sealed at one end and a defined amount of water passes through the bundle under a certain pressure. This process will take a certain time. Based on said time, the membrane surface area, the pressure used and the volume of the water which has passed the membrane, the Lp can be calculated. The equation used is $$Lp = \frac{V}{p \times A \times t} = \frac{V}{\pi \times d \times l \times n \times p \times t}$$

wherein Lp is the convective permeability [·10⁻⁴ cm/bar·s], V is the water volume [cm³], p is the pressure [bar], t is the time, and A is the effective membrane surface of the bundle with A=π·d·l·n (see Examples 2 and 5 for the values used here). The pressure used was 400 mmHg. Table IV summarizes the results for the Lp for the membrane according to the invention (Example 1) and other polysulfone/polyethersulfone and PVP based membranes (dialyzers) according to the state of the art, for comparison. As can be seen there, the membrane according to the present invention ("HDC4") achieves a significantly higher Lp than membranes of the state of the art.

TABLE IV

| Parameter | Unit | HDC4 | O180A | O200A | F8 | F1 | X19 | X21 | R18S | R21S | P210H |
|---|---|---|---|---|---|---|---|---|---|---|---|
| Convective permeability | [cm/(bar · s)]·10⁻⁴ | 75 | 24 | 27 | 40 | 38 | 41 | 46 | 45 | 52 | 62 |

Example 5

Diffusive Permeability $P_{Cl}$

The diffusive permeability was determined with a hand bundle as described in Example 7. First, the diffusion experiment is performed, followed by chloride analysis with AgNO₃. The AgNO₃ solution used had a concentration of 0.100 mol/l. The diffusive permeability of chloride is calculated according to the following equation:

$$P_{Cl} = \frac{Q_B}{60 \times A} \times \ln\frac{c_A - c_D}{c_R}$$

wherein $c_A$ is the starting concentration of NaCl, $c_D$ is the concentration in the dialysate, $c_R$ is the concentration in the retentate, $Q_B$ is the blood flow [ml/min], A is the effective membrane surface of the hand bundle with A=π·d·l·n (see also Example 2; l is the effective fiber length, 236 mm for the membrane according to the invention; d is 190 μm, n is 12024). Measurements were done at 37° C. and $Q_B$ 4 ml/min. The $Q_D$ was 3000 ml/min. The first samples were taken 10 minutes after the start. Samples were collected for three minutes, and the chloride ion concentration is determined for each sample taken with a TTT 85 TITRATOR. FIG. 6 shows the loss of protein for a membrane according to the invention (Example 1) and other membranes (dialyzers) of the state of the art in g/l. Again, it is important to compare the results for this parameter with the efficiency of middle molecule removal for assessing the progress which has been achieved with the present membrane.

Example 6

Urea Clearance

The method for determining the clearance for urea was EN1283. $Q_B$=400 ml/min, $Q_D$=700 ml/min and $U_F$=0 ml/min. Again, the membrane according to a preferred embodiment of the present invention (see Example 1) was compared to membranes (dialyzers) of the state of the art in order to demonstrate that the achievement with regard to permeability and selectivity has no negative influence on the efficiency of the membrane as to the removal of small molecules. As can be seen from Table V, the clearance for urea, as an example for the clearance of small molecules, is among the highest which are currently achieved in dialyzer technology.

TABLE V

| Parameter | Unit | HDC4 | O180A | O200A | F8 | F1 | X19 | X21 | R18S | R21S | P210H |
|---|---|---|---|---|---|---|---|---|---|---|---|
| Clearance Urea | ml/min | 366 | 335 | 354 | 347 | 366 | 356 | 365 | 359 | 370 | 360 |

Example 7

Preparation of Hand Bundles

The preparation of membrane bundles after the spinning process is necessary to prepare the fibre bundle in an adequate way for the performance tests. The first process step is to fix the fibres near their ends by a filament. The fibre bundle is transferred into a sterilization tube and then sterilized. After the sterilization, the fibre bundle is cut to a defined length of 23 cm. The next process step consists of closing the ends of the fibres. An optical control ensures that all fibres are well closed. Then, the ends of the fibre bundle are transferred into a potting cap. The potting cap is fixed mechanically, and a potting tube is put over the potting caps. Afterwards, the potting is done with polyurethane. After the potting, it has to be ensured that the polyurethane can harden for at least one day. In the next process step, the potted membrane bundle is cut to a defined length. The last process step consists of an optic control of the fibre bundle. During this process step, the quality of the cut (is the cut smooth or are there any damages of the knife) and the quality of the potting (is the number of open fibres of the spinning process reduced by fibres that are potted or are there any visible voids where the there is no polyurethane) are controlled. After the optical control, the membrane bundles are stored dry before they are used for the different performance tests.

The invention claimed is:

1. A semipermeable asymmetric hollow fiber membrane prepared by a solvent phase inversion spinning process, said process comprising the steps of:
   a) forming a polymer spinning solution by dissolving polymers consisting essentially of a polyethersulfone, a low molecular weight polyvinylpyrrolidone (PVP) having a molecular weight of below 100 kD, and a high molecular weight PVP having a molecular weight of 100 kD or more,
      wherein the polymer spinning solution comprises between 12-15 weight-% of polyethersulfone,
      wherein the polymer spinning solution comprises between 5-10 weight-% of a total amount of PVP comprising the low molecular weight PVP and the high molecular weight PVP,
   b) extruding the formed polymer spinning solution through an outer ring slit of a nozzle comprising two concentric openings;
   c) extruding a center fluid an inner opening of the nozzle to produce the hollow fiber membrane;
   d) washing the hollow fiber membrane; and
   e) optionally drying and sterilizing the hollow fiber membrane by steam treatment;
      wherein the hollow fiber membrane comprises the polyethersulfone, the low molecular weight PVP, and the high molecular weight PVP,
      wherein the hollow fiber membrane comprises a wall thickness between 30 μm and 40 μm,
      wherein the hollow fiber membrane comprises an inner diameter between 180 μm and 200 μm,
      wherein the hollow fiber membrane has a sieving coefficient for myoglobin in phosphate buffered saline of between 86% and 90%,
      wherein the hollow fiber membrane has a sieving coefficient for albumin in phosphate buffered saline of 9% or less, and
      wherein the hollow fiber membrane has a diffusive permeability $P_{Cl}$ of chloride of between $18 \times 10^{-4}$ and $21 \times 10^{-4}$ cm/s.

2. The hollow fiber membrane according to claim 1, wherein the hollow fiber membrane has a selectivity $SC_{Myo}/SC_{Albu}$ of between 9.4 and 10 or higher.

3. The hollow fiber membrane according to claim 1, wherein the high molecular weight PVP comprises 10-45 weight-% of the total weight of PVP in the hollow fiber membrane, and the low molecular weight PVP comprises 55-90 weight-% of the total weight of PVP in the hollow fiber membrane.

4. The hollow fiber membrane according to claim 1, wherein the membrane comprises an outer surface having pores in the size range of 0.5 to 3 μm, and wherein the number of said pores is in the range of 10,000 to 150,000 pores per mm².

5. The hollow fiber membrane according to claim 1, wherein the hollow fiber membrane is a four-layer structure.

6. The hollow fiber membrane according to claim 5, wherein the four-layer structure comprises a) a separation layer, b) a sponge structure layer, c) a finger structure layer, and d) an outer layer.

7. The hollow fiber membrane according to claim 6, wherein the separation layer has a thickness of less than 1 μm.

8. The hollow fiber membrane according to claim 6, wherein the outer layer has pores in the size range of 0.5 to 3 μm, and wherein the number of said pores is in the range of 10,000 to 150,000 pores per mm².

9. The hollow fiber membrane according to claim 1, wherein the hollow fiber membrane has a diffusive permeability $P_{Cl}$ of chloride of between $19 \times 10^{-4}$ and $20 \times 10^{-4}$ cm/s.

10. The hollow fiber membrane of claim 1, wherein the hollow fiber membrane has a wall thickness 35 μm.

11. The hollow fiber membrane of claim 1, wherein the hollow fiber membrane has an inner diameter of 180 μm.

12. The hollow fiber membrane of claim 1, wherein the hollow fiber membrane has an inner diameter of 190 μm.

13. The hollow fiber membrane of claim 1, wherein the hollow fiber membrane has a wall thickness 35 μm and wherein the hollow fiber membrane has an inner diameter of 190 μm.

14. The hollow fiber membrane of claim 1, wherein the viscosity of the polymer spinning solution is between 2500 and 7000 mPa-s.

15. The hollow fiber membrane of claim 1, wherein the polymer spinning solution comprises the solvent at 66-86% by weight and one or more additives at 1-5% by weight.

16. The hollow fiber membrane of claim 15, wherein the one or more additives are selected from the group consisting of water, glycerol, alcohols, or any combination thereof.

17. The hollow fiber membrane of claim 1, wherein the solvent is selected from the group consisting of n-methylpyrrolidone (NMP), dimethylacetamide (DMAC), dimethylsulphoxide (DMSO), dimethylformamide (DMF), butyrolactone, and any combination thereof.

18. The hollow fiber membrane of claim 1, wherein the solvent is n-methylpyrrolidone (NMP).

19. The hollow fiber membrane of claim 1, wherein the center fluid comprises a liquid selected from the group consisting of water, glycerol, alcohols, and any combination thereof.

20. The hollow fiber membrane of claim 1, wherein the center fluid comprises water at between 51-57% by weight of the center fluid and NMP at between 43-49% by weight.

21. The hollow fiber membrane of claim 1, wherein the hollow fiber membrane comprises polymers consisting essentially of the polyethersulfone, the low molecular weight PVP, and the high molecular weight PVP.

* * * * *